J. J. CRAVEN.
Improvement in Apparatus for Rendering, Drying, and Deodorizing Animal Matter.
No. 132,256. Patented Oct. 15, 1872.
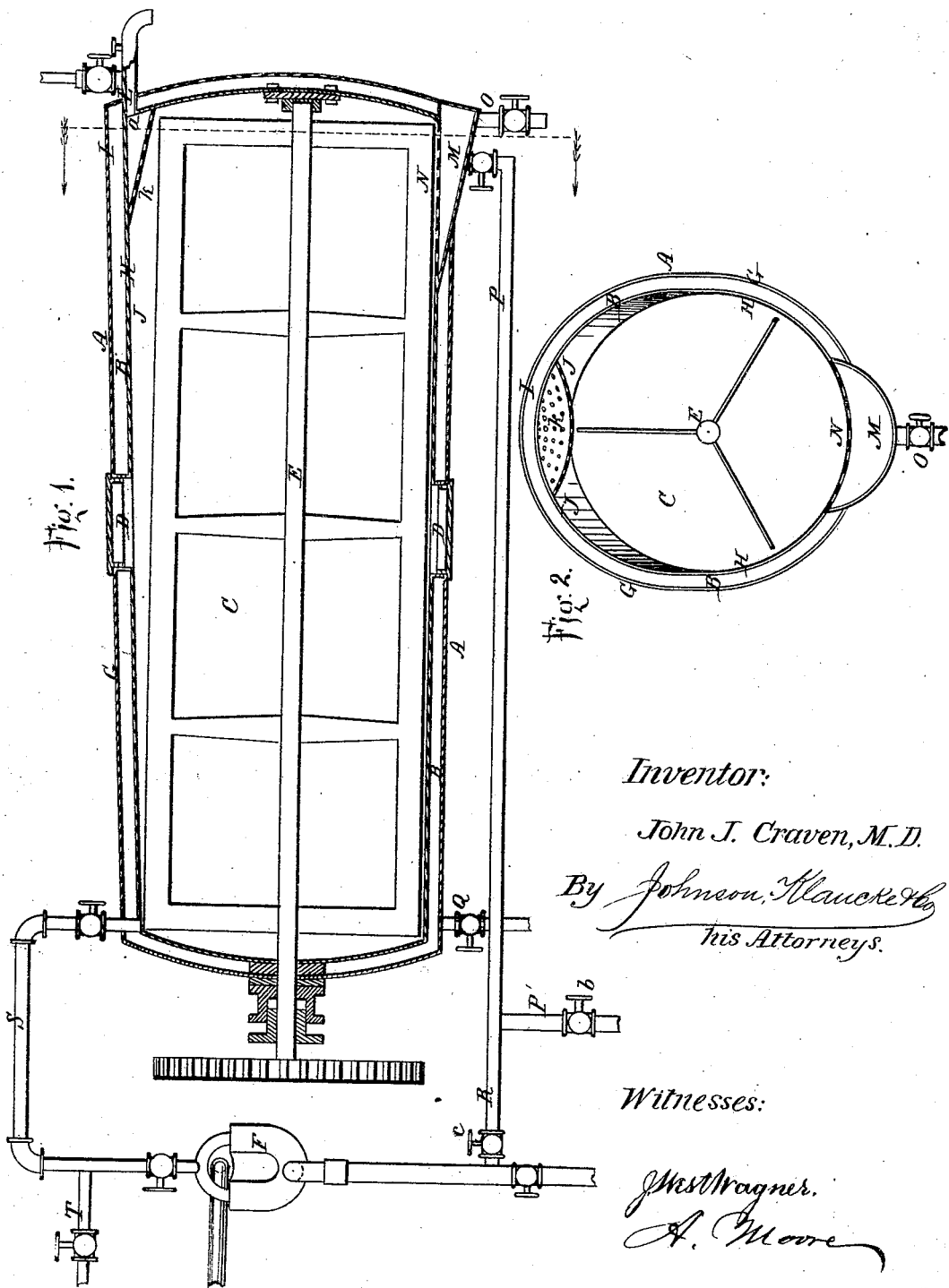
Inventor:
John J. Craven, M.D.
By Johnson, Klaucke &c
his Attorneys.
Witnesses:
Jas. W. Wagner.
A. Moore

UNITED STATES PATENT OFFICE.

JOHN J. CRAVEN, OF BERGEN DISTRICT, JERSEY CITY, NEW JERSEY.

IMPROVEMENT IN APPARATUS FOR RENDERING, DRYING, AND DEODORIZING ANIMAL MATTER.

Specification forming part of Letters Patent No. 132,256, dated October 15, 1872.

*To all whom it may concern:*

Be it known that I, JOHN J. CRAVEN, M. D., of Bergen District, Jersey City, in the State of New Jersey, have invented a new and useful Improvement in Apparatus for Rendering and Drying Animal Matter, and deodorizing the noxious odors arising therefrom during the processes, of which the following is a specification:

My invention is designed and adapted especially for the treatment of animal matter in the extraction of the oils therefrom and effecting the drying of the solid matter or residuum and the perfect deodorization of the noxious odors arising therefrom during such processes, the products being utilized for such purposes as may be found advantageous and best suited for their use; while the apparatus for conducting these processes is especially simplified and rendered of practical utility in the principal features of the operation—viz., the separation and decantation of the oils or fatty matters, the sewerage and drainage of the working-vessel, and the deodorization of the liberated gases and vapors in the treatment of the matter; and to these ends the invention which forms the subject-matter of this patent consists in the construction of the working-chamber of the apparatus so as to form therein a collecting-channel or wedge-shaped space at the top thereof in the direction of its length, to facilitate the drawing off of the oils or fatty matter by crowding them into the collecting space and pushing them forward to the exit-opening by the force of the water which elevates them; in the arrangement of a sewer or drain beneath a jacketed vessel separated from but connected with said vessel by a grate forming a part of its inner wall; the object whereof is to obtain a thorough and practical drainage of the fluids from the working-chamber after the process of rendering and drawing off the oils has been effected; in the employment in such an apparatus of a steam-pipe, in combination with a sewer, for the purpose of keeping the grate of the sewer free and uninterrupted by means of a steam-blast through said sewer; in the introduction of steam to the working-chamber during the process of rendering the matter directly through the sewer connection with said chamber, and thereby save the necessity of making a separate opening in the inner and outer cylinders for that purpose, and thus effect a great saving in the expense of construction in the apparatus, which is a matter of vital importance, while the said grate furnishes a large area for the distribution of the steam within the working-chamber; in combining with said sewer-pipe for introducing steam a branch-pipe leading from the pump, which, by suitable stop-cock connections, is made to introduce water to the working-chamber directly through the sewer connection for the purpose of furnishing water at the commencement, cooling down, elevating, and decanting the oils or fatty matter; in combining with an apparatus for rendering and drying animal matter a condensing-pump, the operation and effect of which embraces the several purposes and functions of reducing the pressure in the working-chamber, when necessary, deodorizing the noxious vapors and gases from said chamber, forcing water into said chamber after the operation of rendering and in the decantation of the oils, and in indicating by the stoppage of the pump the completion of the process of dehydration; in combining, with an apparatus for conducting the processes of rendering, drying, and deodorizing, a pump that will perform the functions above stated automatically—that is to say, a pump that will be rendered operative by the power of the steam within the working-chamber and escaping therefrom under pressure into said pump—such a pump, for instance, as that known as the Hall condensing-pump; in the method of relieving the pressure within the working-chamber during the distinct operations of rendering and elevating and decanting the oils or fatty matters by the employment of a condensing-pump having free communication with said working-chamber; in the method of deodorizing the noxious vapors and gases during the operation of dehydrating; and, finally, of an apparatus for rendering, decanting, deodorizing, and drying in the process of treating animal matter, constructed and arranged to operate as will be more fully hereinafter described.

To enable those skilled in the art to make and use my new apparatus, and to carry out my new methods, as stated, I will proceed to describe its construction and operation, in connection with the accompanying drawing, which forms part of this specification, and in which—

Figure 1 represents a vertical longitudinal section of an apparatus embracing my invention, and Fig. 2 a transverse section of the same at the dotted line $x\ x$ of Fig. 1.

The apparatus consists of a jacketed vessel or cylinder, A, the intermediate annular space constituting a steam-heating chamber, B, and the interior chamber C, to receive the matter to be treated. It is provided with man-holes D at the top and bottom for the introduction and discharge of the matter, and has a central armed shaft, E, for the agitation of said matter within the working-chamber C, under the operation of drying, the said shaft E having suitable stuffing-boxes and driven in any suitable manner. The treatment of the matter is conducted within the working-chamber C, first, under the process of rendering; second, of elevating and decanting the oils or fatty matter; and, third, the drying of the residuum; while the deodorization of the noxious odors and gases is effected outside of said chamber during the said processes. The method by which this latter process is accomplished forms one of the distinguishing features of my invention. It consists in the employment of a condensing-pump, F, with the apparatus, the object whereof is to receive, by a free communication with the chamber C, the noxious vapors forced therefrom by pressure, and to utilize the pressure of the steam to work the condensing-pump, to supply the water to the apparatus when required, or for other purposes, thereby using the same pump, which supplies the chamber C, as a condenser and deodorizer, as will be presently more fully explained.

In apparatus heretofore used for rendering it has been found difficult to obtain an easy and effective means for drawing off the oils or fatty matter, for in such apparatus the oils or fatty matter are floated upon a broad surface, from which it has been found difficult to collect it and direct it to a single outlet. This difficulty would be increased in the use of horizontal tanks, because of the increased area of floating-surface. Moreover, in decanting the oils from such broad surface, a large amount of water must pass out with it before all the oil is run out, and the process is thereby necessarily slow and at best imperfect, as a portion of the oils will remain in patches or distinct pools upon the broad surface. Again, the surface contains more or less light material, which absorbs and holds in suspension by capillary attraction quantities of oil or fatty matter, which is lost without some means of expelling it therefrom; but by my improved expelling process such matter is compressed against the crown or strainer of the chamber, and thus insures the obtaining a more complete separation of the oils from both the material and the water. In my present apparatus I obviate the difficulties mentioned by making the vessel or shells G H at the top, at I, a departure from a true cylindrical form, which departure may start from a horizontal line, or at any point above said line that will produce a tapering space or inverted wedge-like trough, J, from the smallest to the largest end thereof. Into this trough-like space J the oil or fatty matter will be forced from the broad surface by the incoming water, and thus insure a thorough separation of the oil and water and cause the oil to be pushed through this collecting space J, lengthwise of the cylinder, to the discharging-opening. This opening $a$ is provided with a strainer, $k$, extending from the crown in an inclined position to the head, so as to cover and protect said opening $a$ from stoppage by floating matter, and leaves the oil-gate L or outlet free. As the water rises to the crown of the working-chamber the oils will be well separated and forced out at the enlarged end in a continuous column or stream from the trough. Another advantage of this feature is that the strainer can be arranged above and out of the way of the revolving agitating arms. To obtain a thorough drainage of all fluids from the working-chamber I arrange a sewer, M, located at the end and outside of the cylindrical line of the working-chamber C, and provide it with a grate or strainer, N, flush with the inner walls of the chamber C, which, while preventing the escape into the sewer M of solid matter, allows the free passage of fluids. The sewer M has an outer gate, O, for drawing off the water. To relieve the sewer-grate N in case of clogging, a steam-pipe, P, is connected with said sewer by which to let in a blast of steam under pressure and blow out all obstructions from the grate and keep it open.

The rendering process is effected by steam admitted both to the inner and surrounding chambers B C, its admission to the latter being at any convenient point, as shown at Q in the drawing. Steam is admitted to the working-chamber, for rendering, by the pipe P' leading from the generating-boiler to the sewer, the chamber being first partially filled with water. This same pipe P is used for the admission of water to elevate and decant the oils from the chamber, and as a blow-out for the sewer-grate, but the sewer only serves as such when emptying the vessel of fluid matter. The water is admitted to this pipe P by a branch-pipe, R, leading from the pump, the two pipes P' and R having stop-cocks $b$ and $c$, by which to control them. During the process of rendering, the foul air or gases pass off by the pressure of the steam through the pipe S, and into the condensing-pump F, where they are condensed and thoroughly mixed with the water, and rendered innoxious and non-volatile, the said communication being at the pleasure of the attendant, as there may be times during the process when it would be expedient to keep the entire pressure in the working-chamber uninterrupted. The pump F, when the communication is open, receives the noxious vapors and steam within its two chambers alternately, the one filling with water while the steam enters and condenses in the other. In this way the steam and noxious vapors from the vessel furnish the motive power for said pump, the force of the steam carrying out the foul air from the vessel being the remote, and the condensation of the same within the chambers of the pump being the approximate, motive power—a pump known as the Hall steam-condensing pump being well adapted for such purpose: but any other pump with like functions may be used. After the rendering process is completed, the pump is used for filling the chamber C to displace therefrom the oil or fatty matter, in which case the pump is kept working by the pressure of the steam in the chamber, until such pressure is reduced by the filling of said chamber, when the displacement is continued by steam from the boiler by a pipe, T, communicating with said pump. It will be seen, therefore, that the condensing-pump is combined with the apparatus, not only for filling the chamber, but for the more special and useful purpose of deodorizing the noxious gases, which has hitherto been the objectionable part of treating matter with heat. After the steam is cut off from the inner and surrounding chambers, the reduction of the pressure in the working-chamber is effected by first letting out the steam and gases to work the pump; and, second, by cold water forced by the pump into the chamber. This operation, it will be seen, entirely relieves the necessity of expensive separate condensers heretofore used in the blowing off the pressure, for it will be understood by those skilled in the art that it is impossible to extract oils from vessels while the oil is under steam-pressure; and as a high pressure is left in the chamber after the process of rendering, it is necessary to reduce it before the oils can be drawn. This I do without blowing off, by using the condensing-pump direct, and at the same time utilize the escaping pressure to work said pump, which I have found to be of great importance and advantage. After the grease and water have been drawn off, steam is again let into the jacketed chamber B, for the purpose of heating and drying the residuum or solid matter, which is put in motion by the revolving agitators. In this process the condensing-steam pump is again brought into requisition for the purpose of deodorizing the steam or gases that pass from the inner chamber under pressure during the dehydration of the mass. It will be understood that the heat from the jacket will liberate and vaporize the moisture from the mass, thereby again producing a pressure in the vessel. During this operation and as long as there remains any moisture in the material, so long this pump will continue its functions and be a reliable indicator of the completed dehydration of the mass, because, when there is not sufficient expansive power in the steam or gases generated, it will be apparent that the expansion or vaporization of the gases within the chamber have ceased, as the condensing-pump will work with from three to five pounds pressure. I have found by experiment that the exhaustion of the gases and steam cannot be facilitated or hurried by the action of a vacuum-pump, for the reason that the extreme heat of the outer chamber produces such expansion and force of the steam and gases within said chamber that a vacuum cannot be created under such circumstances, and therefore a vacuum cannot facilitate the drying.

I am aware that it has been attempted and claimed by others in drying process, that a vacuum-pump will exhaust from the heating vessel or chamber the noxious and other vapors and gases as fast as generated therein; but such a thing is simply impossible, the heated walls producing such rapid vaporization of the moisture as to forbid the possibility of any ordinary pump, or a limited number of such pumps, to even reach an equilibrium; but by the use of the condensing-pump I simply aim to keep pace with the process of drying within the tank, and deodorize the liberated gases until the pressure in the vessel is reduced to a degree that will not work the pump, which will be apparent that vaporization has ceased, and consequently dehydration is completed. The action of the pump is thus not only rendered automatic to deodorize and pump water, but serves as a hydrometer.

In forcing the oil from the tank it may be discharged as described, or elevated through a column with a glass indicator, as heretofore patented to me under date of September 17, 1872.

I have described a particular form of vessel to obtain a collecting and discharging channel or wedge-shaped space for the oils, but I do not intend thereby to confine myself to such specific means, as the gist of this part of my invention may be reached in various ways without in the least departing from the spirit of such invention; for instance, the vessel may occupy an inclined position to form such channel or inequality in the surface-line between the water and the top, in which case the sewer would be located at the opposite end and the agitators correspondingly arranged to prevent the accumulation of the mass at the lower end from the inequality of the lines of the lower side of the vessel.

Having described my invention, I claim, under this patent—

1. In apparatus for the treatment of animal matter for extracting oils and fats, a vessel having an interior collecting-channel or wedge-shape space, J, to facilitate the decantation of the oils and fatty matter from the working-chamber.

2. In combination with a longitudinal interior collecting-channel or wedge-shaped space, J, I claim the inclined strainer k, arranged within said channel or space, as described.

3. The drain or sewer M, arranged beneath the jacketed vessel A, separated from but connected with it by a grate, N, which forms a part of the inner wall of the working-chamber, as described.

4. In a rendering and drying apparatus for animal matter, I claim the combination, with a sewer therein, of a pipe, P, for introducing through said sewer both water and steam direct into the working-chamber.

5. As a means for keeping the grate of the working-chamber free and unobstructed, I claim the introduction of a blast of steam into the sewer, as described.

6. The introduction of steam into the working-chamber C through the grate of the sewer connection, thereby obtaining a large area for the distribution of steam into said working-chamber.

7. In apparatus for treating animal matter to extract oils and dry the residuum, I claim the combination therewith of a condensing-pump, the operation of which will effect the reduction of the pressure in the working-chamber, deodorize the noxious vapors, supply the chambers with water to decant the oils, and indicate the absence of pressure when dehydration is completed.

8. The method of relieving the pressure within the working-chamber by means of a free communication of the chamber with the condensing-pump during the distinct operations of rendering the matter and elevating and decanting the oils.

9. The method of deodorizing the noxious vapors and gases during the operation of dehydrating, by means of an automatic condensing-pump.

10. I claim the apparatus constructed and arranged for joint operation in the processes of rendering, decanting, deodorizing, and drying, substantially as herein described.

In testimony whereof I have hereunto set my hand this 10th day of October, A. D. 1872.

JOHN J. CRAVEN, M. D.

Witnesses:
   A. E. H. JOHNSON,
   J. W. HAMILTON JOHNSON.